United States Patent [19]

Oeming

[11] Patent Number: 4,653,158
[45] Date of Patent: Mar. 31, 1987

[54] CRANKSHAFT MACHINING DEVICE

[75] Inventor: Joseph A. Oeming, Saginaw, Mich.

[73] Assignee: Brettrager Manufacturing Co., Saginaw, Mich.

[21] Appl. No.: 865,794

[22] Filed: May 22, 1986

[51] Int. Cl.$^4$ .............................................. B23D 37/22
[52] U.S. Cl. .......................................... 29/6; 409/264; 409/272
[58] Field of Search .................... 29/6; 409/264, 265, 409/268, 269, 270, 272, 282; 82/9

[56] References Cited

U.S. PATENT DOCUMENTS

| | | | |
|---|---|---|---|
| 2,039,480 | 5/1936 | Floeter | 409/270 |
| 2,280,229 | 4/1942 | Groene et al. | 409/272 |
| 2,330,968 | 10/1943 | Groene et al. | 29/6 |
| 2,650,522 | 9/1953 | Godfriaux | 29/6 |
| 3,460,413 | 8/1969 | Hermann | 82/9 |
| 3,537,354 | 11/1970 | Veazey | 409/234 |
| 3,727,494 | 4/1973 | Rohs | 82/2.5 |
| 3,757,615 | 9/1973 | Oeming et al. | 82/9 |
| 3,808,653 | 5/1974 | Oeming et al. | 82/9 |
| 3,832,919 | 9/1974 | Jacobi et al. | 82/9 |
| 4,044,638 | 8/1977 | Heffron et al. | 82/9 |
| 4,080,852 | 3/1978 | Heffron et al. | 82/9 X |
| 4,276,794 | 7/1981 | Berbalk | 82/9 X |
| 4,437,328 | 3/1984 | Wittkopp et al. | 29/6 |
| 4,494,280 | 1/1985 | Blaimschein | 29/6 |

FOREIGN PATENT DOCUMENTS 642093  1/1979  U.S.S.R. .................................. 29/6

Primary Examiner—William R. Briggs
Attorney, Agent, or Firm—Gifford, Groh, VanOphem, Sheridan, Sprinkle and Dolgorukov

[57] ABSTRACT

A device for machining the crank pins of a crankshaft which are radially offset from the crankshaft axis of rotation. A first master shaft having an axis of rotation and radially offset crank pins corresponding to the crank pins of the crankshaft is rotatably mounted in a housing. A substantially identical master shaft is rotatably mounted to one end of a cradle which has its other end pivotally mounted about the axis of the first master shaft and movable between a first and second position. A girt is rotatably mounted to each of corresponding crank pins on both master shafts so that, as the master shafts are rotatably driven in synchronism with each other and with the crankshaft, cyclical movement is imparted to each girt. A broach is attached to each girt adjacent the crankshaft so that, as the cradle is moved from its first to its second pivotal position, the broach moves tangentially with respect to the crankshaft crank pins and thereby machines the crank pins.

7 Claims, 8 Drawing Figures

CRANKSHAFT MACHINING DEVICE

BACKGROUND OF THE INVENTION

I. Field of the Invention

The present invention relates to a device for machining the crank pins of a crankshaft.

II. Description of the Prior Art

Crankshafts of the type used in internal combustion reciprocal piston engines include at least two main bearings which are rotatably mounted to the engine crankcase and a plurality of crank pins to which the piston connecting rods are rotatably attached. Furthermore, these crank pins have an axis substantially parallel to, but radially spaced from, the rotational axis of the crankshaft. Consequently, the crank pins move cyclically during rotation of the crankshaft.

Both the main bearings and the crank pins for the crankshaft must be machined in order to form a bearing surface. Machining the main bearings is straightforward since the crankshaft is merely rotatably driven about its axis and the main bearings machined by turning, grinding, or the like.

Conversely, machining the crank pins to form the required bearing surface presents a more difficult problem since the axis of the crank pins are radially offset from the rotational axis of the crankshaft. There have been a number of previously known devices and methods for machining the crank pins.

One previously known method for machining the crank pins is to rotatably drive the crankshaft about the crank pins axis and then machine the crank pins in any conventional fashion. This previously known method, however, is undesireable since the crankshaft must be rotatably driven around each different crank pin axis. As such, multiple sequential machining operations must be performed on the crankshaft which increases the overall machining costs and time for the crankshaft.

There have, however, been a number of previously known machines which are designed to simultaneously machine all of the crank pins for the crankshaft. These previously known machines typically comprise a first master shaft having a plurality of offset crank pins which correspond to the crank pins of the crankshaft which is to be machined. The master shaft is rotatably mounted to a housing while another substantially identical master shaft is rotatably mounted to one end of a cradle. The other end of the cradle is pivotally mounted around the rotational axis of the first master shaft and movable between a first and a second position. Since the master shafts are substantially identical to each other, each crank pin on the first master shaft has a corresponding crank pin on the second master shaft which is both radially offset and angularly positioned the same.

A plate or girt is then rotatably mounted to each of corresponding crank pins on both master shafts so that, as the master shafts and the crankshaft are rotatably driven in synchronism with each other, each girt replicates the cyclical movement for its associated crank pin on the crankshaft. A tool bit mounted to each girt engages its associated crank pin on the crankshaft as the cradle is pivotted from its first and to its second position to thereby machine the crankshaft crank pins. Conventionally, the tool engages the crank pin diametrically as the cradle is pivoted from its first and to its second position.

One disadvantage of these previously known crankshaft machining devices is that all crank pins are machined simultaneously with each other. As such, the tools as well as the crankshaft undergo a tremendous tool load or tool pressure during the machining operation. This high tool load not only causes heating and occasional distortion of the crankshaft, but also results in a relatively short tool life for the cutting tools. As such, the tools must be frequently replaced thereby resulting in down time for the machine.

SUMMARY OF THE PRESENT INVENTION

The present invention provides a device for machining crank pins on a crankshaft which overcomes all the above-mentioned disadvantages of the previously known devices.

Like the previously known devices which simultaneously machine the crank pins, the device of the present invention comprises a master shaft having crank pins corresponding to the crank pins of the crankshaft to be machined rotatably mounted within a housing. A second master shaft is rotatably mounted to a cradle which, in turn, is pivotally mounted to the housing about the rotational axis of the first master shaft.

Similarly, a plurality of girts are rotatably mounted between their corresponding crank pins on the two master shafts for each crank pin to be machined on the crankshaft. Consequently, these girts move in a cyclical pattern corresonding to the cyclical movement of the crankshaft crank pin as the master shafts and crankshaft are rotatably driven in synchronism with each other.

Unlike the previously known devices, however, a broach is secured to each girt so that the broach moves tangentially with respect to its associated crank pin as the cradle is pivoted from its first and to its second position. The broaches thus machine the crank pins by turn broaching.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 8:
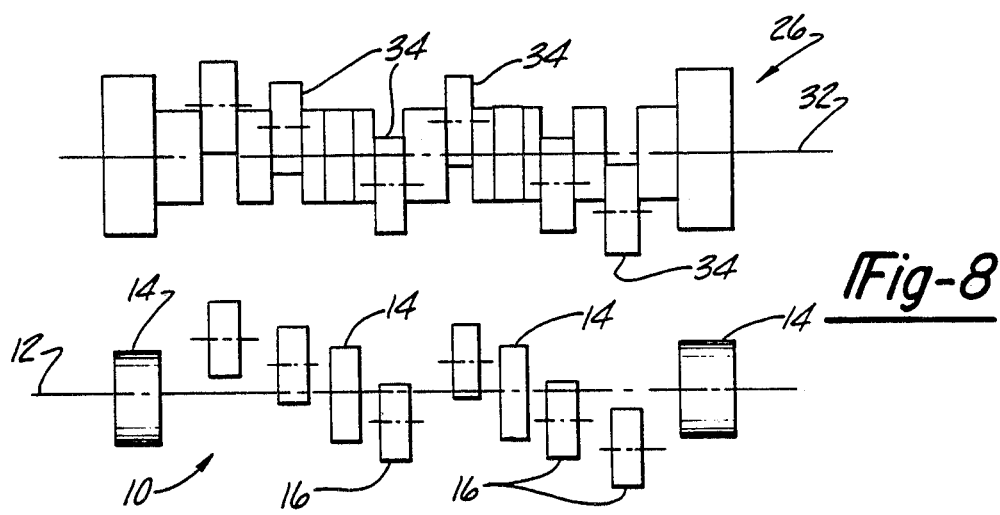
FIG. 8 is a front diagrammatic view illustrating a crankshaft and one master shaft.

With reference first to FIG. 8, a crankshaft 10 is thereshown in diagrammatic form which, in use, rotates about its axis 12. A plurality of spaced main journals 14 are machined in any conventional fashion so that they are coaxial with the crankshaft axis 12. In addition, a pluraliy of crank pins 16 each have an axis parallel to, but radially offset from, the crankshaft axis 12. The device of the present invention machines the crank pin 16 to form a bearing surface in a fashion to be subsequentially described in greater detail.

Figure 1:
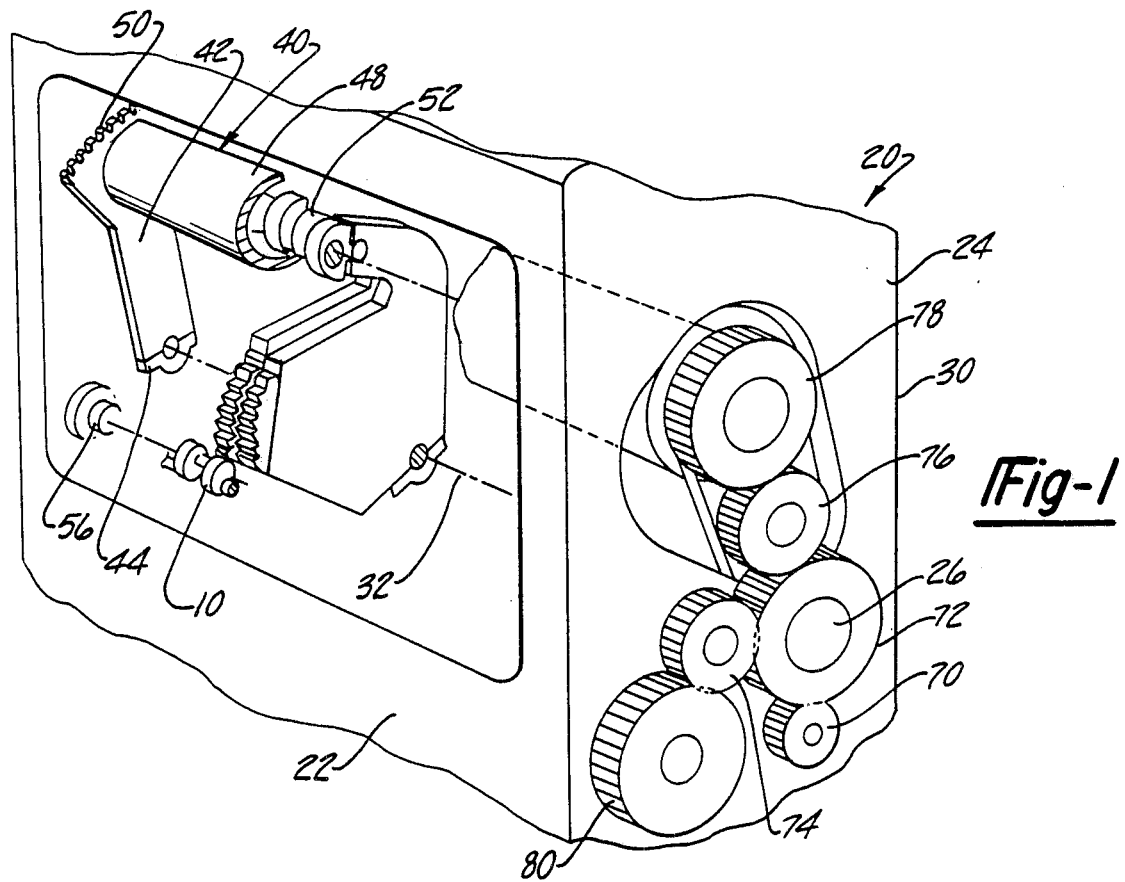
FIG. 1 is a fragmentary perspective view illustrating a preferred embodiment of the present invention.
Figure 2:
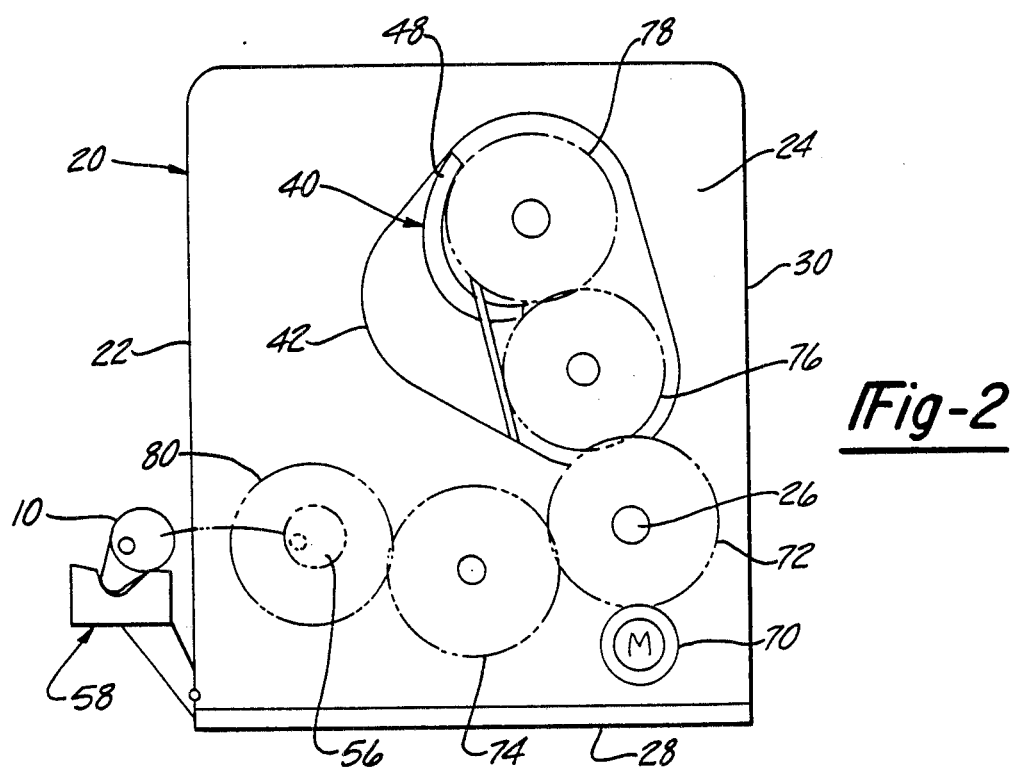
FIG. 2 is a diagrammatic side view of the preferred embodiment of the present invention.

With reference then to FIGS. 1 and 2, the crankshaft machining device of the present invention comprises a housing 20 having a front 22, rear 30, bottom 28 and sides 24. A first master shaft 26 is rotatably mounted to the housing 20 by any conventional means so that the first master shaft 26 is adjacent to, but spaced upwardly from, the bottom 28 and inwardly from the rear 30 of the housing 20. As best shown in FIG. 8, this master shaft 26 is adapted to be rotatably driven about is axis 32 and includes a plurality of crank pins 34 which are radially offset from its axis 32 of rotation. Furthermore, each crank pin 34 has an axis which is both radially and angularly offset from the axis 32 by an amount corresponding to the angular and radial offset of its corresponding crank pin 16 of the crankshaft 10.

Figure 3:
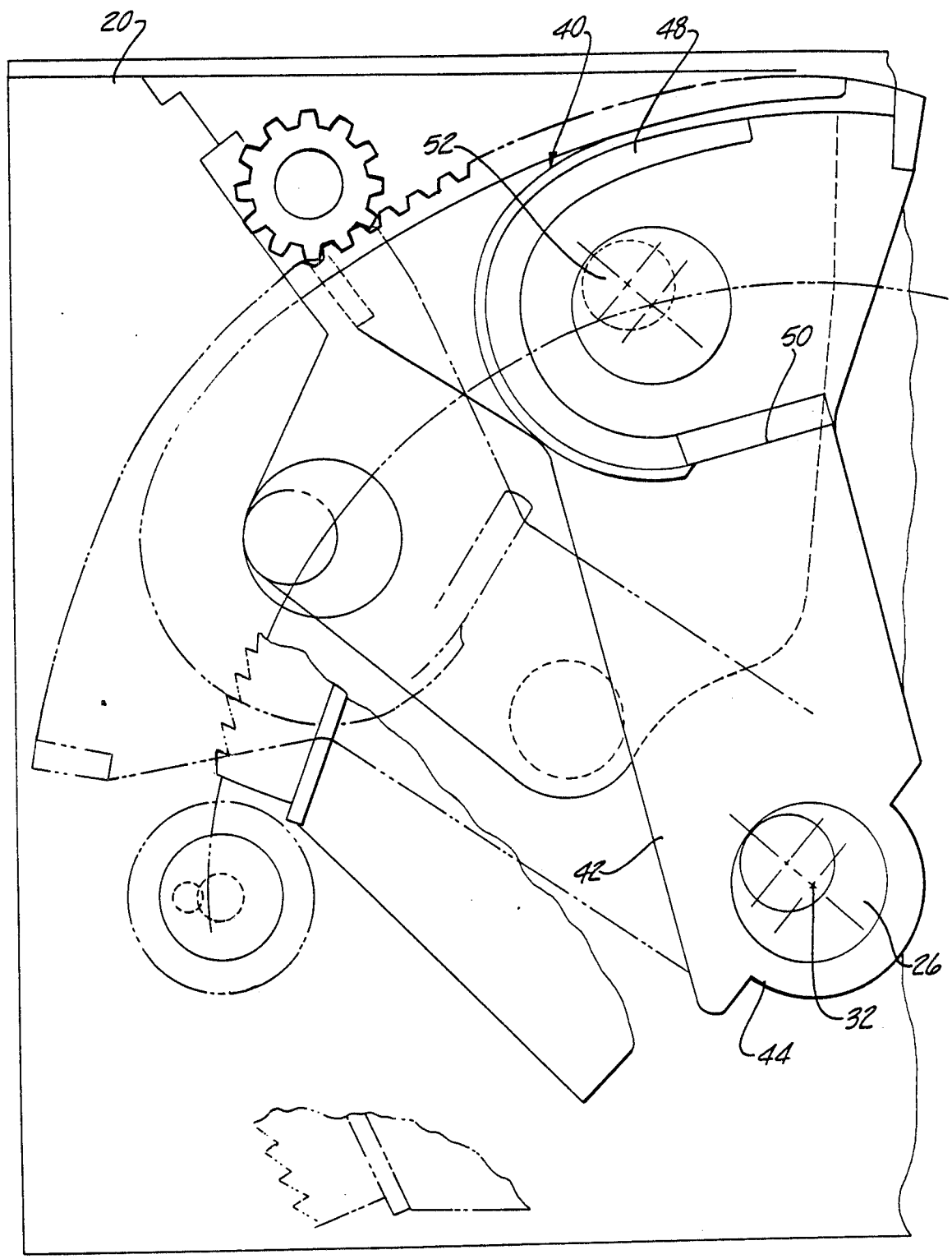
FIG. 3 is a side view taken substantially along line 3—3 in FIG. 5 and with parts removed for clarity.
Figure 5:
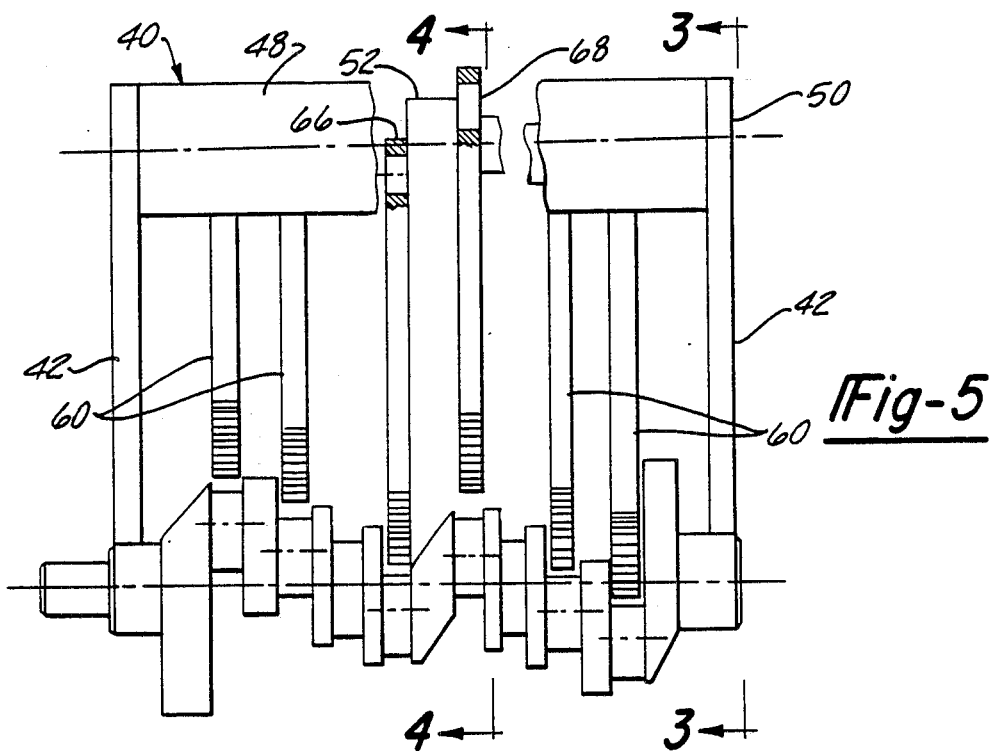
FIG. 5 is a front view of the preferred embodiment of the invention and with parts removed for clarity.

With reference then to FIGS. 2, 3 and 5, a cradle 40 includes two spaced side arms 42 which are pivotally mounted at one end 44 about the axis 32 of the master shaft 26. A cross bar 48 extends between the arms 42 adjacent their other end 50 so that the entire cradle 40 pivots in use about the axis of the master shaft 26.

As best shown in FIGS. 3 and 5, a second master shaft 52, which is substantially identical to the first master shaft 26, is rotatably mounted to the cradle side arms 42 adjacent their upper ends 50. Furthermore, the axis of the second master shaft 52 is parallel to and spaced from the axis of the first master shaft 26 despite the pivotal position of the cradle 40.

As shown in FIGS. 1 and 2, a pair of crankshaft chucks 56 are rotatably mounted to the housing 20 so that the chucks 56 are coaxial with each other and also parallel to the axes of the master shafts 26 and 52. The chucks 56 are spaced apart from the other and are adapted to engage opposite ends of the crankshaft 10 to be machined. Any conventional loading and unloading means 58 (FIG. 2) is employed to load and unload the crankshaft 10 into and out from the chucks 56. Furthermore, when the crankshaft 10 is loaded into the chucks 56, the crankshaft is angularly positioned so that each of its crank pins 16 is at the same angular position as its corresponding crank pins on the master shafts 26 and 52.

Figure 4:
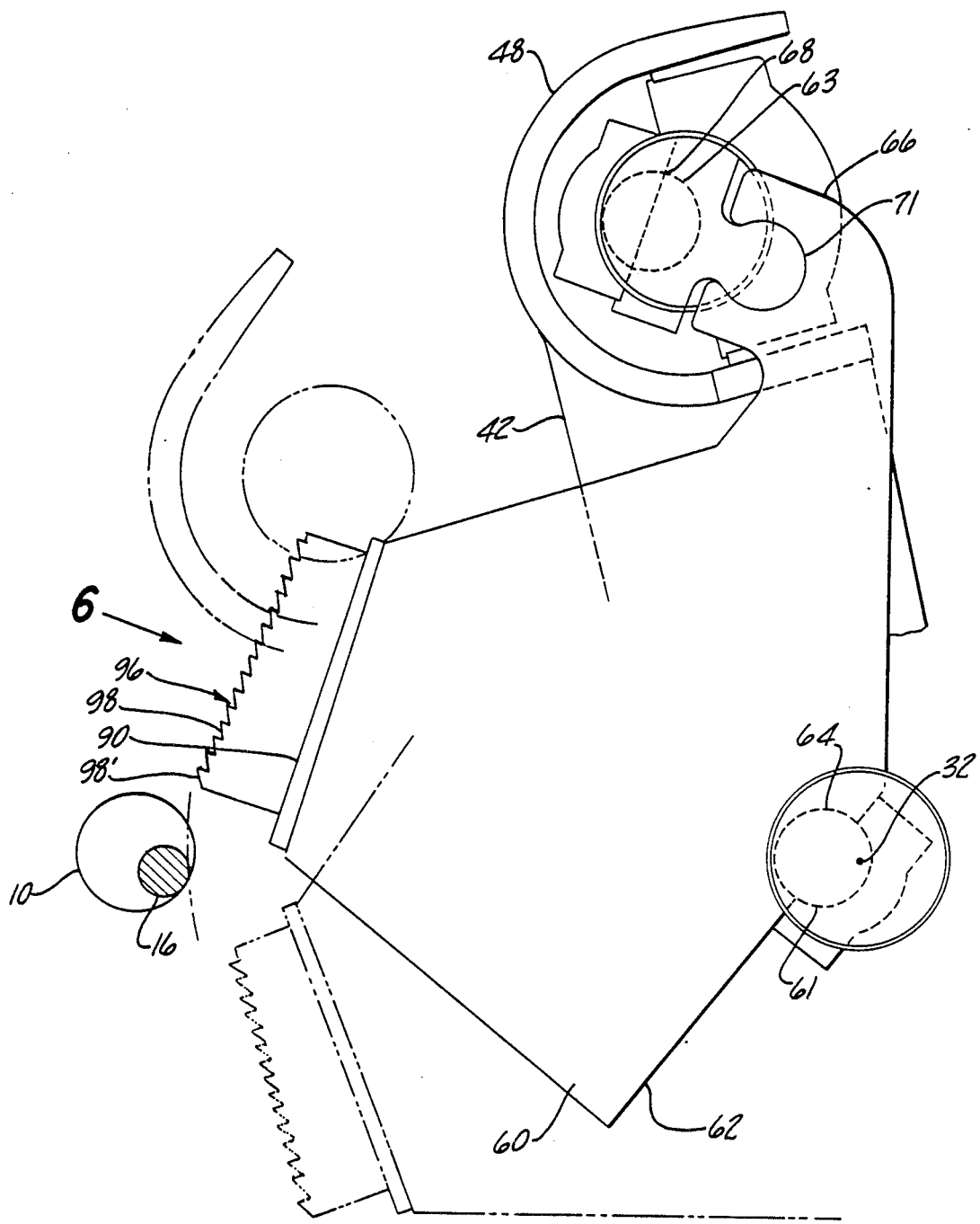
FIG. 4 is a view taken substantially along line 4—4 in FIG. 5 and with parts removed for clarity.

With reference now to FIGS. 4 and 5, the present invention further comprises a plurality of substantially planar girts 60 so that one girt 60 is associated with each crank pin 16 on the crank shaft 10 and, thus, the corresponding crank pins 34 on the master shafts 26 and 52. Each girt 60 is rotatably mounted adjacent its lower end 62 by conventional bearings 61 to its associated crank pin 64 on the master shaft 26. Similarly, an upper end 66 of each girt 60 is rotatably mounted by bearings 63 to its associated crank pin 68 on the second master shaft 52. The girt 60 includes a knuckle joint 71 adjacent its upper rotational connection with the crank pin 68 of the master shaft 52 to allow for small tolerances between the master shafts 26 and 52.

With reference now particularly to FIGS. 1 and 2, a motor 70 rotatably drives a first gear 72 which is secured to the first master shaft 26. Idler gears 74 and 76 are in mesh with the gear 72 and respectively rotatably drive a pinion 78 secured to the second master shaft 52 and a pinion 80 secured to one crank shaft chuck 56. A substantially identical gearing arrangement is preferably provided on the opposite side 24 of the housing 20 so that, upon activation of the motor 70, the master shaft 26 and 52 as well as the crankshaft chucks 56 are rotatably driven in synchronism with each other.

With reference again to FIG. 4, the cyclical or circular movement of the master shaft crank pins 34 impart a like cyclical or circular movement to the girts 60. Consequently, assuming that the cradle 40 is maintained stationary, a forward end 90 of each girt 60 maintains a constant spaced apart relationship with respect to the crank shaft crank pin 16 associated with that particular girt 60.

With reference now to FIGS. 3 and 4, as previously described, the cradle 40 is pivotal between a first pivotal position, illustrated in phantom line, and a second pivotal position, illustrated in solid line. Although any conventional means can be used to pivot the girt between its first and second pivotal positions, preferably a gear rack 92 (FIG. 3) meshes with a motor driven pinion 94 rotatably mounted to the housing 20 so that rotation of the pinion 94 swings the cradle forwardly between its first and second pivotal positions. Preferably, a servomotor and encoder 95 are used to drive the pinion 94.

Figures 6, 7:
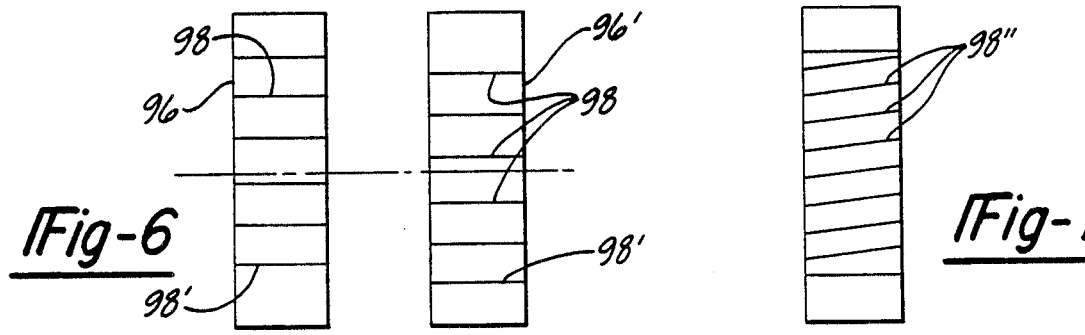
FIG. 6 is a plan view taken substantially along arrow 6 in FIG. 4.
FIG. 7 is a view similar to FIG. 6 but illustrating a modification thereof.

With reference now to FIGS. 4 and 6, a broach 96 is secured to the forward end 90 of each girt 60. Each broach 96 includes a plurality of cutting blades 98 which protrude progressively more outwardly from the top of the broach and towards its bottom as best shown in exaggeration in FIG. 4. Consequently, as the broach moves from its pivotal position (phantom line) and to its second pivotal position, the broach cutting blades 98 tangentially engage the crankshaft crank pin 16 and perform progressively deeper cuts with the lowermost cutting blade 98' machining the crankshaft crank pin 16 to its final desired diameter.

With reference now to FIG. 6, in one form of the invention, the cutting blades 98 on the broaches 96 extend generally parallel to the axis of the crank pin 16. Thus, as the cutting blades 98 engage the crankshaft crank pin 16, they shave the crank pin 16 thus machining by turn broaching. In addition, preferably the cutting blades 98 on one broach 96 are offset from the cutting blades 98 on the broach 96' on a different girt 60 thereby minimizing the number of cutting blades 98 which engage the crank pins 16 during any pivotal position of the girt 60. Consequently, by offsetting the cutting blades 98 on one broach from the other broaches 96', the tool pressure is minimized during the turn broaching operation.

With reference now to FIG. 7, an alternate form of the broach 96 is thereshown in which the cutting blades 98" are skewed with respect to the axis of the crankshaft crank pin 16. Thus, when the broach 96 illustrated in FIG. 7 is substituted for the broach illustrated in FIG. 6, the crank pins 16 are machined by skiving rather than by shaving. Both shaving and skiving, however, when applied to a rotating work as in the instant invention are collectively known as turn broaching.

In operation, the crankshaft is loaded into the crankshaft chucks 56 so that the crankshaft crank pins 16 are angularly at the same position as their corresponding or associated crank pins 34 on the master shafts 26 and 52. At this time, the cradle 40 is in its lowermost position so that the girts 60 are also in their lower or first position illustrated in phantom line in FIG. 4.

The motor 70 then rotatably drives the master shafts 26 and 52 and crankshaft 16 in synchronism with each other. Simultaneously, the pinion 94 (FIG. 3) is rotatably driven thus pivoting the cradle 40 from its first position, illustrated in phantom line of FIG. 4 and to its second position, illustrated in solid line in FIG. 4. In doing so, each broach 96 tangentially engages its associated crankshaft crank pin 16 to thereby machine the crankshaft crank pin 16. Furthermore, since in the preferred embodiment of the invention the broach blades on one girt 60 are longitudinally offset from the broach blades on the other girts, tool pressure is minimized during the turn broaching operation.

When the cradle 40 reaches its second pivotal position, the turn broaching operation on the crank pin 16 is completed and the crankshaft 10 is removed and replaced with a new crankshaft 10 whereupon the above process is repeated.

From the foregoing, it can be seen that the present invention provides a device for turn broaching the crank pins of a crankshaft. Since only a relatively small amount of material is removed from the crank pins by each broach cutting blade 98, tool pressure on the crankshaft crank pins is minimized. This in turn, minimizes heating and possible thermal distortion of the crankshaft during the machining process also lengthens the tool life for the broaches 96.

The servomotor and encoder 95 also enables the machine to be used with conventional plunge turning, facing tools and the like.

Having described my invention, many modifications thereto will become apparent to those skilled in the art to which it pertains without deviation from the spirit of the invention as defined by the scope of the appended claims.

I claim:

1. A device for machining the crank pins of a crankshaft comprising:
   a housing,
   a pair of substantially identical master shafts, each master shaft having one crank pin associated with each other and with each crank pin on the crankshaft,
   means for rotatably mounting one master shaft to the housing,
   means for rotatably mounting the crankshaft to the housing,
   a cradle,
   means for pivotally mounting said cradle to said housing about an axis of said one master shaft between a first and a second pivotal position,
   means for rotatably mounting the other master shaft to said cradle so that said master shafts are spaced apart and parallel to each other,
   a plurality of generally planar girts,
   means for rotatably mounting one girt to the associated crank pins on said master shafts,
   means for rotatably driving said master shafts and the crankshaft in synchronism with each other,
   a plurality of broaches, one broach being mounted to each girt adjacent its associated crankshaft crank pin and at a position so that said broaches move tangentially with respect to their associated crankshaft crank pins as said cradle moves between said first and said second pivotal positions, and
   means for moving said cradle between said first pivotal position and said second pivotal position so that said broaches engage and machine the crank pins on the crankshaft.

2. The invention as defined in claim 1 wherein each said broach comprises a plurality of spaced cutting blades which sequentially engage its associated crankshaft crank pin as said cradle moves from said first and to said second position.

3. The invention as defined in claim 2 wherein the cutting blades on one broach are tangentially offset with respect to the pivotal axis of said cradle from the cutting blades on another broach.

4. The invention as defined in claim 2 wherein said cutting blades are skiving cutting blades.

5. The invention as defined in claim 2 wherein said cutting blades are shaving cutting blades.

6. The invention as defined in claim 1 wherein said moving means comprises
   a gear segment secured to said cradle,
   a pinion rotatably mounted to said housing and in mesh with said gear segment, and
   means for rotatably driving said pinion.

7. The invention as defined in claim 6 wherein said means for rotatably driving said pinion comprises a servomotor and encoder.

* * * * *

UNITED STATES PATENT AND TRADEMARK OFFICE
CERTIFICATE OF CORRECTION

PATENT NO. : 4,653,158

DATED : March 31, 1987

INVENTOR(S) : Joseph A. Oeming

It is certified that error appears in the above-identified patent and that said Letters Patent is hereby corrected as shown below:

Column 2, line 28, delete "coresonding" and insert

--corresponding--.

Signed and Sealed this

Twentieth Day of October, 1987

Attest:

DONALD J. QUIGG

*Attesting Officer*  *Commissioner of Patents and Trademarks*